(12) United States Patent
Marcil et al.

(10) Patent No.: US 7,963,344 B2
(45) Date of Patent: Jun. 21, 2011

(54) TILLER WITH REMOVABLE BATTERY

(75) Inventors: Patrick Marcil, Ottawa (CA); P. Wade Mooney, Brockville (CA); Florin Baetica, Brockville (CA); Olga Makeev, Mallorytown (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/540,939

(22) Filed: Aug. 13, 2009

(65) Prior Publication Data

US 2010/0051299 A1     Mar. 4, 2010

Related U.S. Application Data

(60) Provisional application No. 61/093,918, filed on Sep. 3, 2008.

(51) Int. Cl.
*A01B 33/00* (2006.01)

(52) U.S. Cl. .......................................... 172/43; 172/354

(58) Field of Classification Search ................ 172/42, 172/43, 256, 259, 329, 351, 354, 358, 359, 172/362, 364; 37/270, 271; 56/17.1, 17.2, 56/322

See application file for complete search history.

(56) References Cited

U.S. PATENT DOCUMENTS

| | | | |
|---|---|---|---|
| 2,903,077 A * | 9/1959 | Kamlukin | 172/42 |
| 3,180,428 A * | 4/1965 | Price | 172/42 |
| 3,204,704 A | 9/1965 | Goette | |
| 3,550,714 A | 12/1970 | Bellinger | |
| 3,658,135 A | 4/1972 | Thompson | |
| 3,710,870 A | 1/1973 | Pfeiffer | |
| 3,792,734 A * | 2/1974 | Ellis et al. | 172/43 |
| 3,901,325 A * | 8/1975 | Richards | 172/81 |
| 3,935,905 A | 2/1976 | Chery | |
| 4,074,764 A | 2/1978 | Enters | |
| 4,136,983 A | 1/1979 | Dobberpuhl | |
| 4,139,064 A * | 2/1979 | Dobberpuhl | 172/43 |
| 4,164,983 A | 8/1979 | Hoch | |
| 4,165,786 A * | 8/1979 | Dobberpuhl | 172/43 |
| 4,224,996 A * | 9/1980 | Dobberpuhl | 172/42 |
| 4,305,470 A | 12/1981 | Anderson | |
| 4,351,396 A | 9/1982 | Moulton | |
| 4,452,316 A | 6/1984 | Edwards | |
| 4,541,492 A | 9/1985 | Motruk | |
| 4,567,949 A | 2/1986 | Herscher | |

(Continued)

FOREIGN PATENT DOCUMENTS

DE          86 25 564         12/1986

(Continued)

*Primary Examiner* — Robert E Pezzuto
*Assistant Examiner* — Matthew D Troutman
(74) *Attorney, Agent, or Firm* — Harness, Dickey & Pierce, P.L.C.

(57) ABSTRACT

A tiller can include a frame supported by at least one wheel. An upright assembly can extend from the frame. A drive mechanism can be supported by the frame and include a motor having an output member. A tilling implement can have a drive shaft that is driven by the output member. The tilling implement can comprise at least one tine plate. A slider assembly can communicate with the wheel and be movably coupled along the upright assembly. The slider assembly can be configured to securably locate in at least a first position wherein the wheel is located at a first elevation relative to the frame and a second position wherein the wheel is located at a second elevation relative to the frame. The first and second elevations can be distinct.

13 Claims, 17 Drawing Sheets

U.S. PATENT DOCUMENTS

| | | | |
|---|---|---|---|
| 4,591,001 A | 5/1986 | Barbee | |
| 4,648,464 A | 3/1987 | Huxley | |
| 4,699,219 A | 10/1987 | Durrant et al. | |
| 4,753,062 A | 6/1988 | Roelle | |
| 4,811,794 A | 3/1989 | Greene | |
| RE33,238 E | 6/1990 | Moulton et al. | |
| 5,048,617 A | 9/1991 | Haven | |
| 5,085,043 A | 2/1992 | Hess et al. | |
| 5,163,273 A | 11/1992 | Wojtkowski et al. | |
| 5,197,551 A | 3/1993 | Farley | |
| 5,490,370 A | 2/1996 | McNair et al. | |
| 5,562,166 A | 10/1996 | Griffin | |
| 5,573,069 A * | 11/1996 | Shipley | 172/42 |
| 5,850,882 A | 12/1998 | Link | |
| 5,937,622 A | 8/1999 | Carrier et al. | |
| 5,960,889 A | 10/1999 | McLaren | |
| 6,092,608 A | 7/2000 | Leger | |
| 6,404,078 B1 | 6/2002 | Thomas et al. | |
| 6,488,101 B1 | 12/2002 | Miyahara et al. | |
| 6,606,845 B1 | 8/2003 | Spies | |
| 6,631,770 B2 | 10/2003 | Guard et al. | |
| 6,651,752 B2 | 11/2003 | Sasaoka | |
| 6,708,774 B2 | 3/2004 | Miyahara et al. | |
| 6,766,601 B2 | 7/2004 | Dickins | |
| 6,779,611 B2 | 8/2004 | Sugimoto et al. | |
| 6,904,976 B1 | 6/2005 | Zach et al. | |
| 6,962,209 B2 * | 11/2005 | Isaman et al. | 172/19 |
| D523,026 S | 6/2006 | Vaughn | |
| 7,237,620 B2 | 7/2007 | Abenroth et al. | |
| 2005/0045347 A1 * | 3/2005 | Stark et al. | 172/42 |
| 2006/0059880 A1 | 3/2006 | Angott | |
| 2008/0163520 A1 * | 7/2008 | White et al. | 37/260 |

FOREIGN PATENT DOCUMENTS

| | | |
|---|---|---|
| EP | 1698221 A1 | 9/2006 |
| FR | 1 196 512 A | 11/1959 |
| FR | 2 845 959 A1 | 4/2004 |
| JP | 10-271901 A | 10/1998 |

* cited by examiner

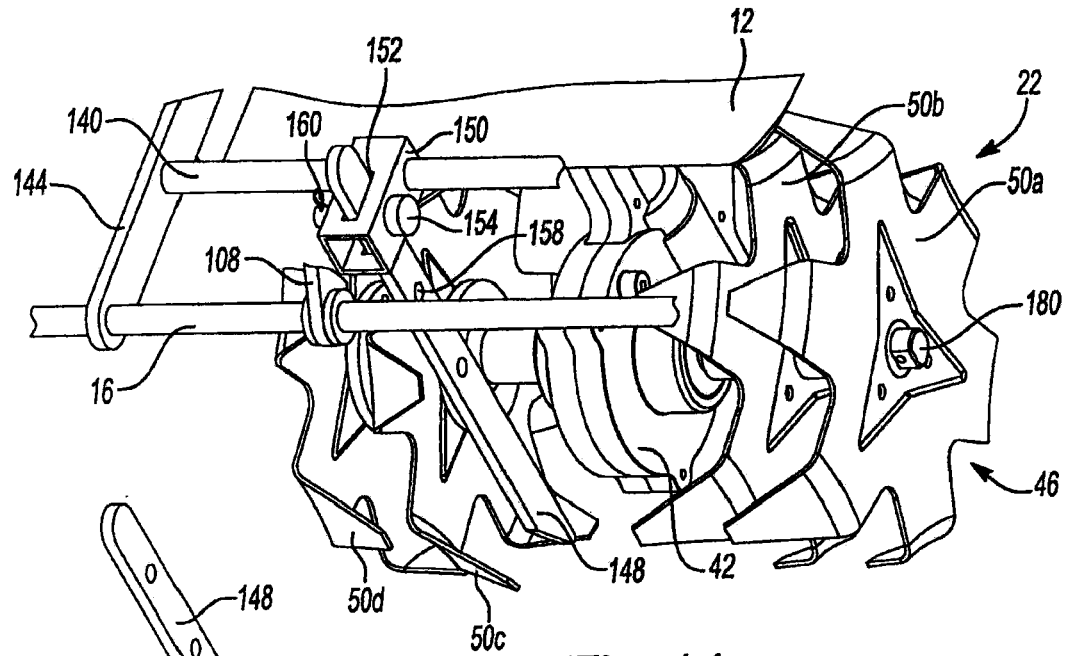
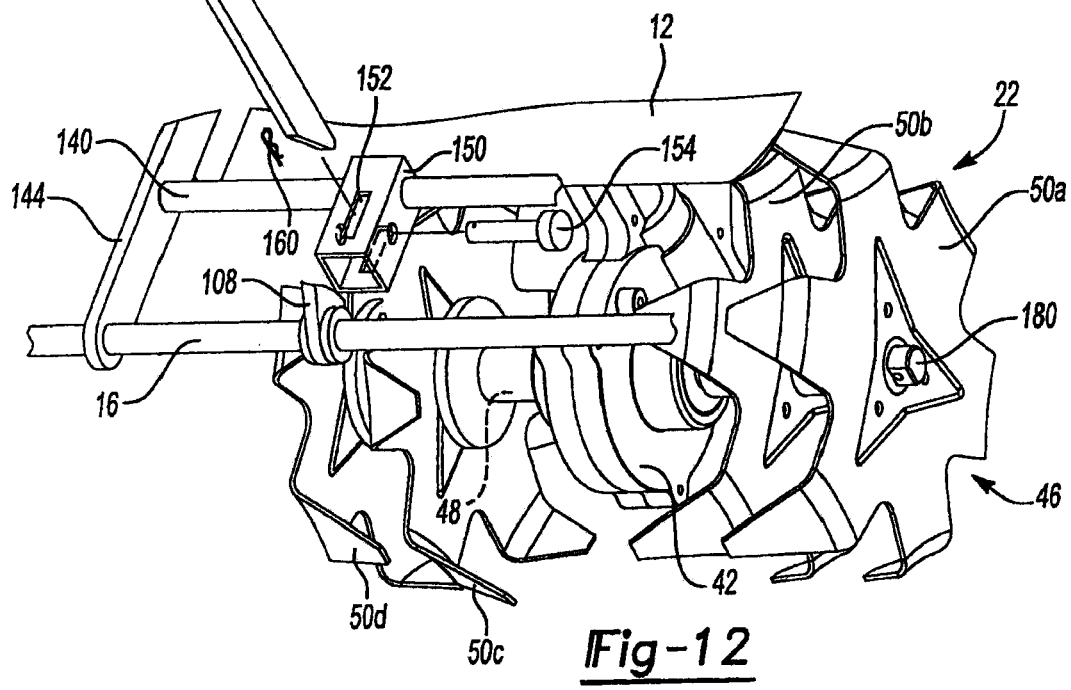

TILLER WITH REMOVABLE BATTERY

CROSS-REFERENCE TO RELATED APPLICATIONS

This application claims the benefit of U.S. Provisional Application No. 61/093,918, filed on Sep. 3, 2008. The entire disclosures of the above application are incorporated herein by reference.

FIELD

The present disclosure relates to tillers and more specifically to a cordless electric tiller.

BACKGROUND

Due to concerns regarding urban air pollution, as well as other factors, electric outdoor power equipment has been gaining in popularity. Moreover, due to the inconveniences and operating limitations of corded electric outdoor power equipment, battery operated equipment may be preferred. However, such electric and/or battery operated tillers can have drawbacks. By way of example, some of these drawbacks can be associated with the functionality of the battery. Such drawbacks can include insufficient battery life, and inconvenient battery manipulation (i.e., such as during installation and removal of the battery from the tiller.

SUMMARY

A battery-powered tiller according to the present teachings includes a frame that is supported by at least one wheel. The frame can include a receiving portion thereon. A drive mechanism can include a motor having an output member. A tilling implement can be driven by the output member. A battery can be removably received into the receiving portion of the frame. The battery can supply a current to the motor in an installed position. The battery can be positioned at a substantially centralized location on the frame.

According to additional features, a pair of wheels can be provided on the frame and be positioned generally at an outboard location of the frame. The battery can be positioned between the two wheels on the frame. In one example, the battery can be thirty-six (36) volts DC. The battery can define a generally box-like housing having a forward side, a rearward side, an upper side, and a bottom side. The handle can be formed on the upper side.

According to still other features, the battery can define a first mating portion that is configured to selectively mate with a second mating portion defined on the tiller to electrically couple the battery to the motor. The first mating portion can be formed on the handle in one configuration or on the rearward side of the box-like housing according in another configuration. The box-like housing also defines a catch thereon for physically securing the battery to the frame. The catch is configured to selectively mate with a latch formed on the receiving portion of the frame in the installed position.

A tiller can include a frame and a drive mechanism that is supported by the frame. The drive mechanism can include a motor having an output member. A tilling implement can have a drive shaft that is driven by the output member. The tilling implement can comprise a first tine plate and a second tine plate. The first and second tine plates can be selectively configurable along the drive shaft at a plurality of positions and orientations in an installed position.

According to additional features, the first tine plate can define a first body and a plurality of first tines. The second tine plate can define a second body and a plurality of second tines. The first tines can extend at an angle relative to the first body. The second tines can extend at an angle relative to the second body. The first tine plate can define a first hub. The second tine plate can define a second hub. The first tines can extend at an angle generally toward the first hub and the second tines can extend at an angle generally toward the second hub.

The first and second hubs can define a central passage formed therethrough that slidably accept the drive shaft in the installed position. The central passages of the first and second hubs both define a flat that cooperatively aligns with a flat formed along the drive shaft in the installed position.

According to other features, each of the first and second hubs can define an aperture that cooperatively aligns with one of a plurality of apertures formed along the drive shaft. A pin can be selectively located through the respective apertures for locating the first and second tine plates at the plurality of positions along the drive shaft. The first and second hubs can be configured for assembly in a first position wherein the first and second plurality of tines are oriented in a generally inboard direction and in a second position wherein the first and second plurality of tines are oriented in a generally outboard direction.

According to still other features, the tiller can further comprise a third and a fourth tine plate. The third tine plate can define a third body and a plurality of third tines. The fourth tine plate can define a fourth body and a plurality of fourth tines. The third tines can extend at an angle relative to the third body and the fourth tines can extend at an angle relative to the fourth body. The first, second, third and fourth tines are selectively configurable along the drive shaft for concurrent operation in a plurality of positions and orientations in an installed position. In one example, the first, second, third and fourth tine plates are configured equivalently.

A tiller can include a frame supported by at least one wheel. An upright assembly can extend from the frame. A drive mechanism can be supported by the frame and include a motor having an output member. A tilling implement can have a drive shaft that is driven by the output member. The tilling implement can comprise at least one tine plate. A slider assembly can communicate with the wheel and be movably coupled along the upright assembly. The slider assembly can be configured to securably locate in at least a first position wherein the wheel is located at a first elevation relative to the frame and a second position wherein the wheel is located at a second elevation relative to the frame. The first and second elevations can be distinct.

The upright assembly can comprise a pair of longitudinal members that extend from the frame and define a first and second pair of slots formed therein. The slider assembly also comprises a bar that selectively locates into one of the first and second pair of slots in response to manipulation of the slider assembly. The slider assembly can comprise a handle that moves relative to a housing. The bar can move in response to movement of the handle. According to one example, an effective length of the bar is reduced upon movement of the handle in a first direction causing opposite ends of the bar to withdraw from a respective pair of slots. The slider assembly can be configured to securably locate in a third position. The wheel can be located at a third elevation relative to the frame in the third position. The third elevation can be distinct from the first and second elevations. A link can couple the slider assembly to the wheel.

A tiller can include a frame supported by at least one wheel. An upright assembly can extend from the frame. A drive mechanism can be supported by the frame and include a motor that has an output member. A tilling implement can have a drive shaft that is driven by the output member in a first rotational direction. The tilling implement can include at least one tine plate. An unjamming mechanism can include a key that is selectively rotatable in a first receiving member. Rotation of the key can cause the tilling implement to rotate in a second rotational direction that is opposite the first rotational direction.

According to additional features, the unjamming mechanism can include an unjamming motor that is operably coupled to the tilling implement. Rotation of the key can cause the unjamming motor to operate. The unjamming mechanism can further comprise a gearing unit that translates rotational motion of the key into rotational motion of the tilling implement. According to one configuration, the unjamming motor can rotate multiple times for every rotation of the tilling implement.

According to still other features, the tiller can comprise a battery that is removably received into a receiving portion defined on the frame and that supplies a current to the motor at an installed position. The key can be selectively received into a second receiving member on the frame during normal operation of the tiller. According to one example, the current can be supplied to the motor only upon receipt of the key into the second receiving member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 11 is a rear perspective view of a tilling implement of the battery-powered tiller of FIG. 1 and shown with an exemplary drag bar in an installed position;

FIG. 12 is a rear perspective view of the tilling implement of FIG. 11 and shown with the drag bar in an exploded position;

DETAILED DESCRIPTION

Figure 1:
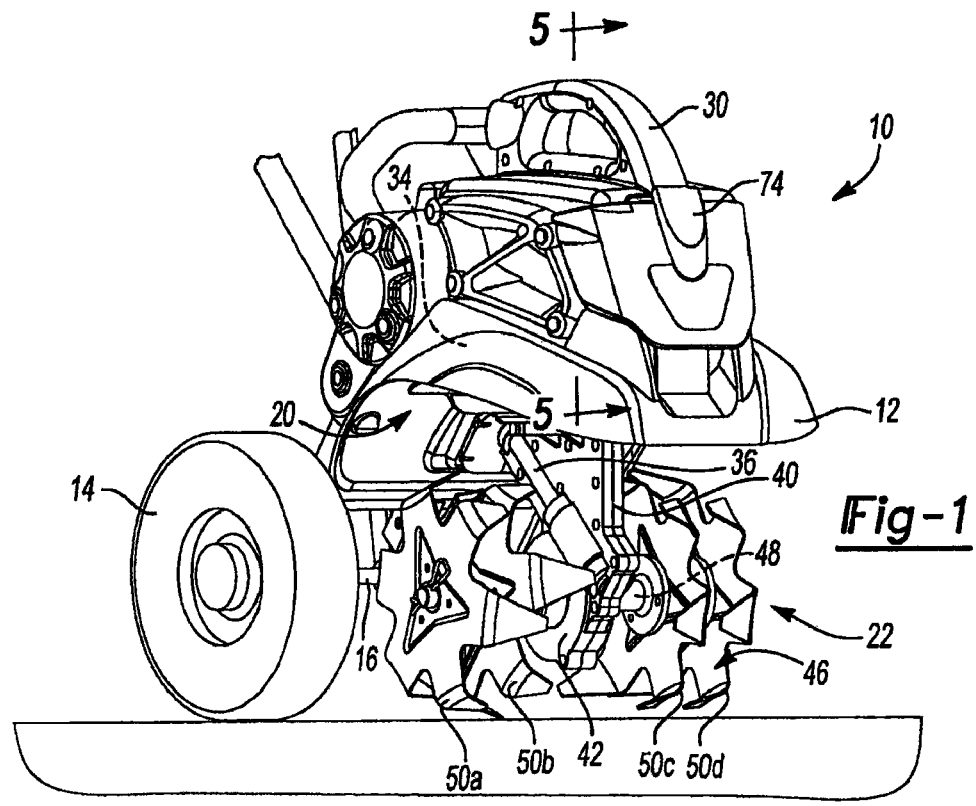
FIG. 1 is a front perspective view of a battery-powered tiller constructed in accordance with one example of the present teachings and shown with a battery in an installed position.
Figure 2:
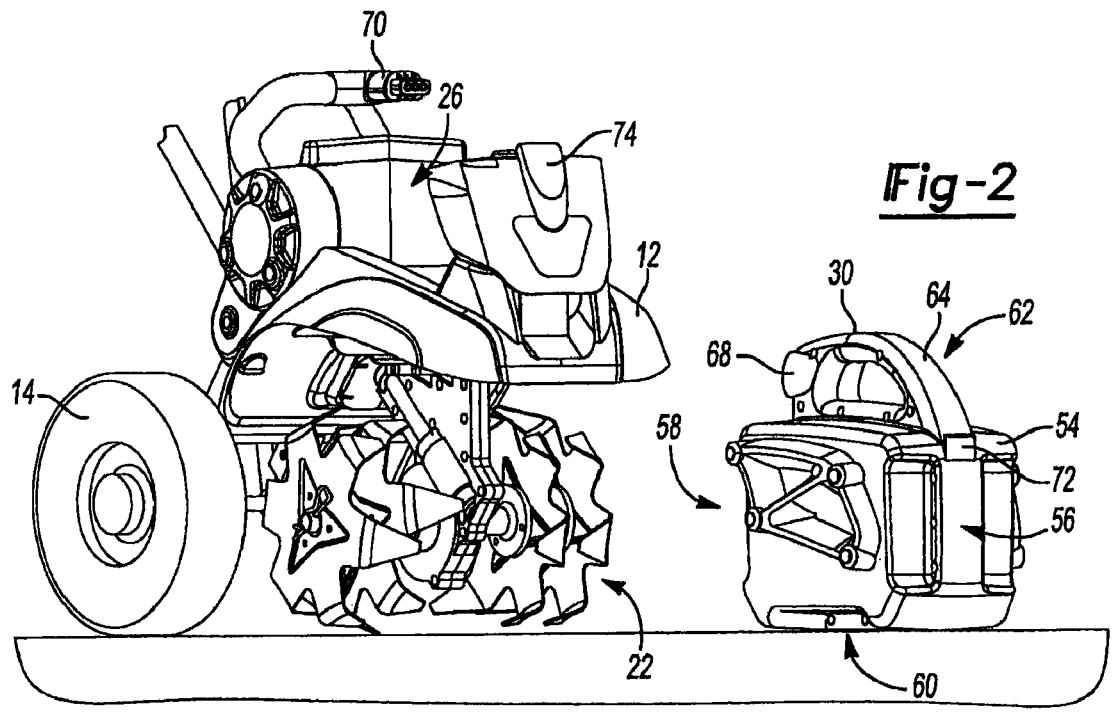
FIG. 2 is a front perspective view of the battery-powered tiller of FIG. 1 and shown with the battery removed.
Figure 3:
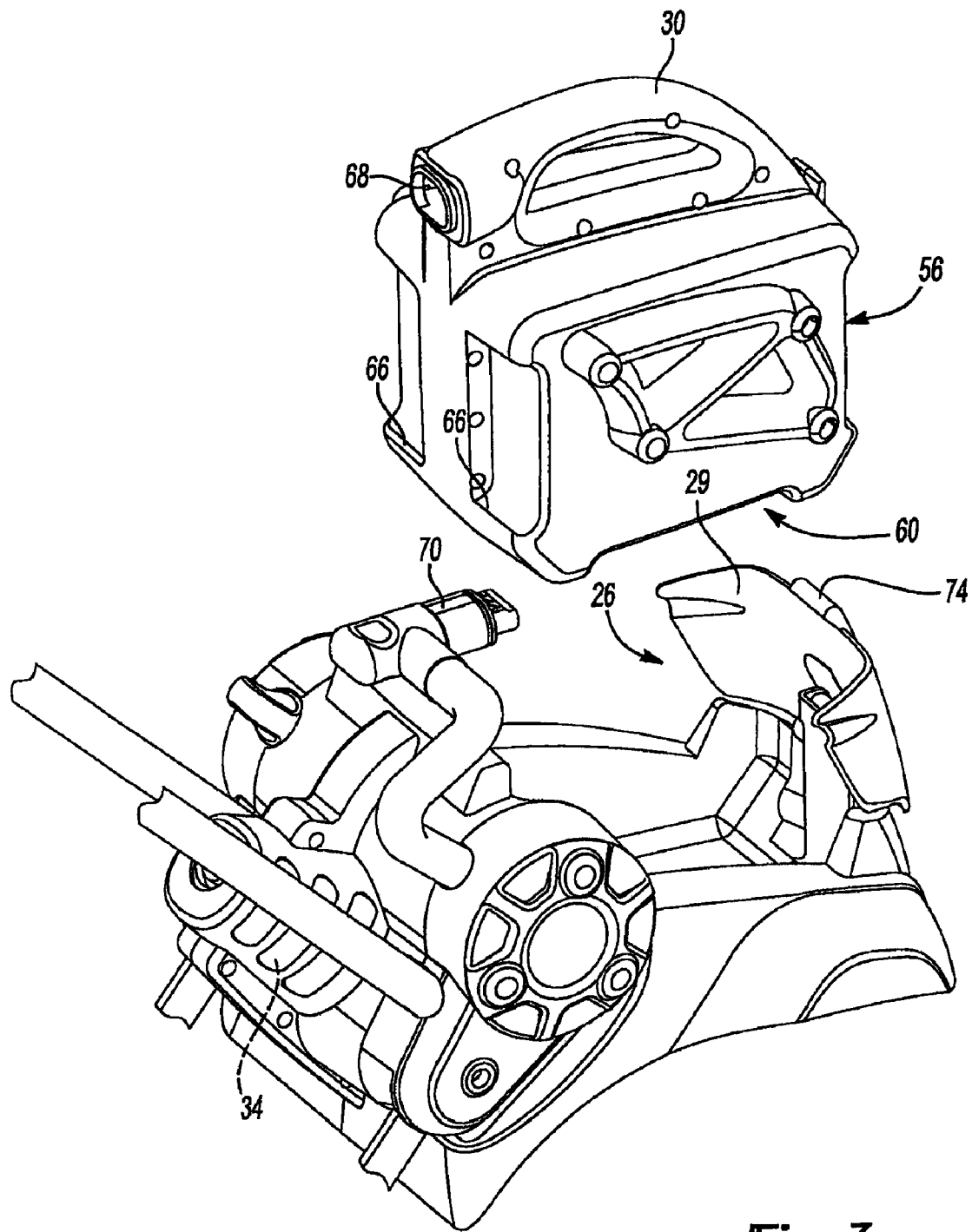
FIG. 3 is an exploded side perspective view of the battery and battery receiving portion.
Figure 4:
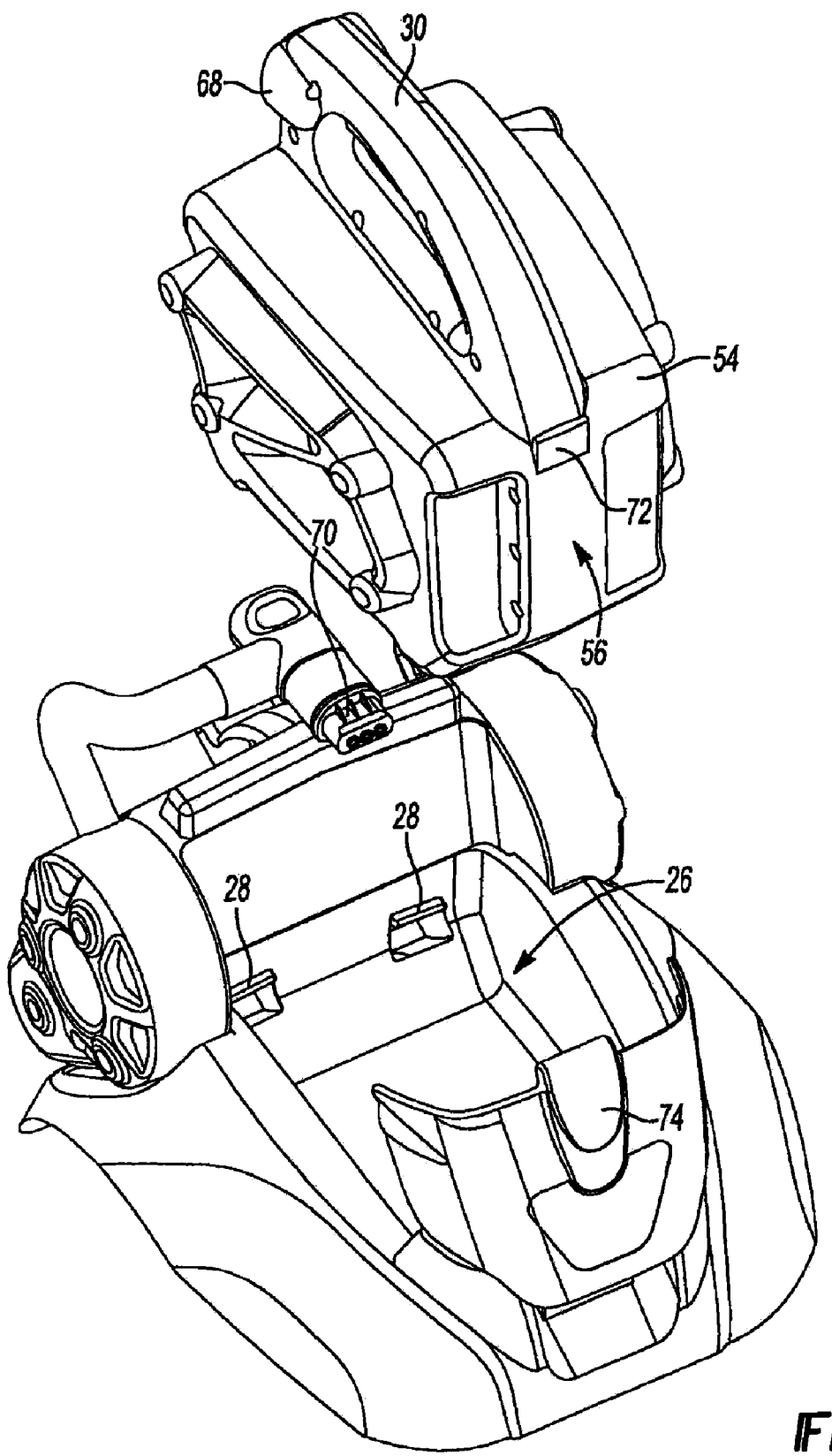
FIG. 4 is an exploded front perspective view of the battery and battery receiving portion.

With initial reference to FIGS. 1-6, a battery-powered tiller constructed in accordance with the present teachings is shown and generally identified at reference numeral 10. The tiller 10 generally comprises a frame 12 supported by a pair of wheels 14 that are connected by way of an axle 16. The tiller 10 further includes a driving mechanism 20, a tilling implement 22, and an upright assembly 24. The frame 12 also defines a receiving portion 26 (FIG. 2) including a pair of L-shaped tabs 28 (FIGS. 4 and 5) and a battery guide 29 (FIGS. 3 and 4). The receiving portion 26 is configured to receive a battery 30 in an installed position (FIG. 1).

The drive mechanism 20 includes a motor 34 having an output member 36. The output member 36 is connected at a first portion to the motor 34 and at a second portion to the tilling implement 22 and communicate a rotational output from the motor 34 to a rotational output of the tilling implement 22. The output member 36 is configured as a longitudinal shaft that is supported at least partially by an axle support 40 and a gear housing 42.

The tilling implement 22, as will be discussed in greater detail herein, generally defines a plurality of tine plates (collectively referred to at reference 46) that are rotatably supported by a drive shaft (axle) 48. In the example shown, the plurality of tines 46 include a first tine plate 50a, a second tine plate 50b, a third tine plate 50c, and a fourth tine plate 50d.

The battery 30 according to the present teachings provides thirty-six volts direct current (DC). It is appreciated that the battery 30 can be configured to provide other voltages, such as between 12 volts and 60 volts DC. One suitable battery configuration providing thirty-six volts direct current is discussed in commonly owned U.S. Provisional Patent Application No. 61/048,002 entitled "Mower", which is expressly incorporated herein by reference. As can be appreciated, the battery 30 provides a current to the motor 34 when installed for driving the tilling implement 22.

The battery 30 generally defines a free standing box-like housing 54 (see FIG. 2). The housing 54 is generally defined by a forward side 56, a rearward side 58, a bottom side 60, and an upper side 62. A handle 64 is located on the upper side 62 in a generally centralized location extending upward from the housing 54. A pair of rear heels 66 are defined on the housing 54. As will be described, the heels 66 cooperatively engage the L-shaped tabs 28 (FIG. 5) in an installed position. A first mating portion 68 is defined on the handle 64 that is configured to mechanically and electrically mate with a second mating portion 70 defined on the frame 12 of the battery-powered tiller 10. The housing 54 further includes a catch 72 formed on the forward side 56 in a location generally opposite of the first mating portion 68.

Figure 5:
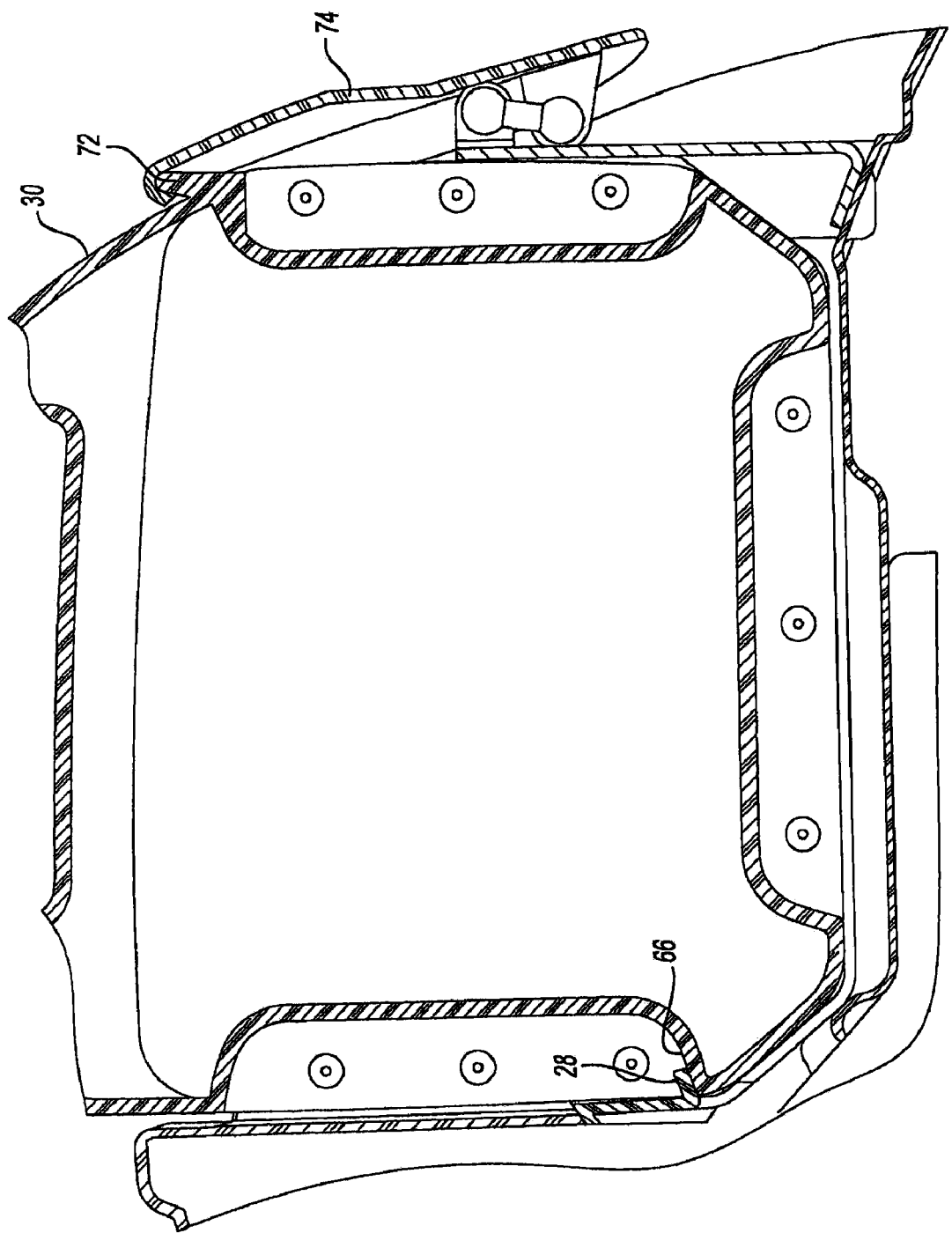
FIG. 5 is a cut-away view of the battery shown installed in to the battery receiving portion.

In the preferred method of securing the battery 30 to the receiving portion 26 of the battery-powered tiller 10, a user first aligns the contour of the battery housing 54 with the guide 29 defined on the frame 12. The battery 30 is then advanced downwardly (i.e., further into the receiving portion 26) allowing the respective heels 66 to positively engage the L-shaped tabs 28 (FIG. 5). The catch 72 defined on the battery 30 is then mechanically coupled with a latch 74 defined on the frame 12 at a location generally proximate to the receiving portion 26. An audible "click" can be observed by the user once sufficient rotation of the battery 30 into the receiving portion 26 causes the catch 72 to be secured with the latch 74. An electrical connection can then be established by mating the portion 70 of the tiller 10 to the portion 68 of the battery 30. To remove the battery 30 from the receiving portion 26, a user manipulates (such as move in a downward direction as viewed in FIG. 1) the latch 74 to disengage the catch 72 of the battery 30 for removal.

The battery 30 is located in a generally centralized location on the frame 12 above the tilling implement 22 and intermediate of the wheels 14. In this way, the center of gravity of the battery 30 can be efficiently managed by an operator with the tilling implement 22 and the resultant "stance" of the wheels 14. The battery 30 can also be located elsewhere on the tiller 10.

Figure 6:
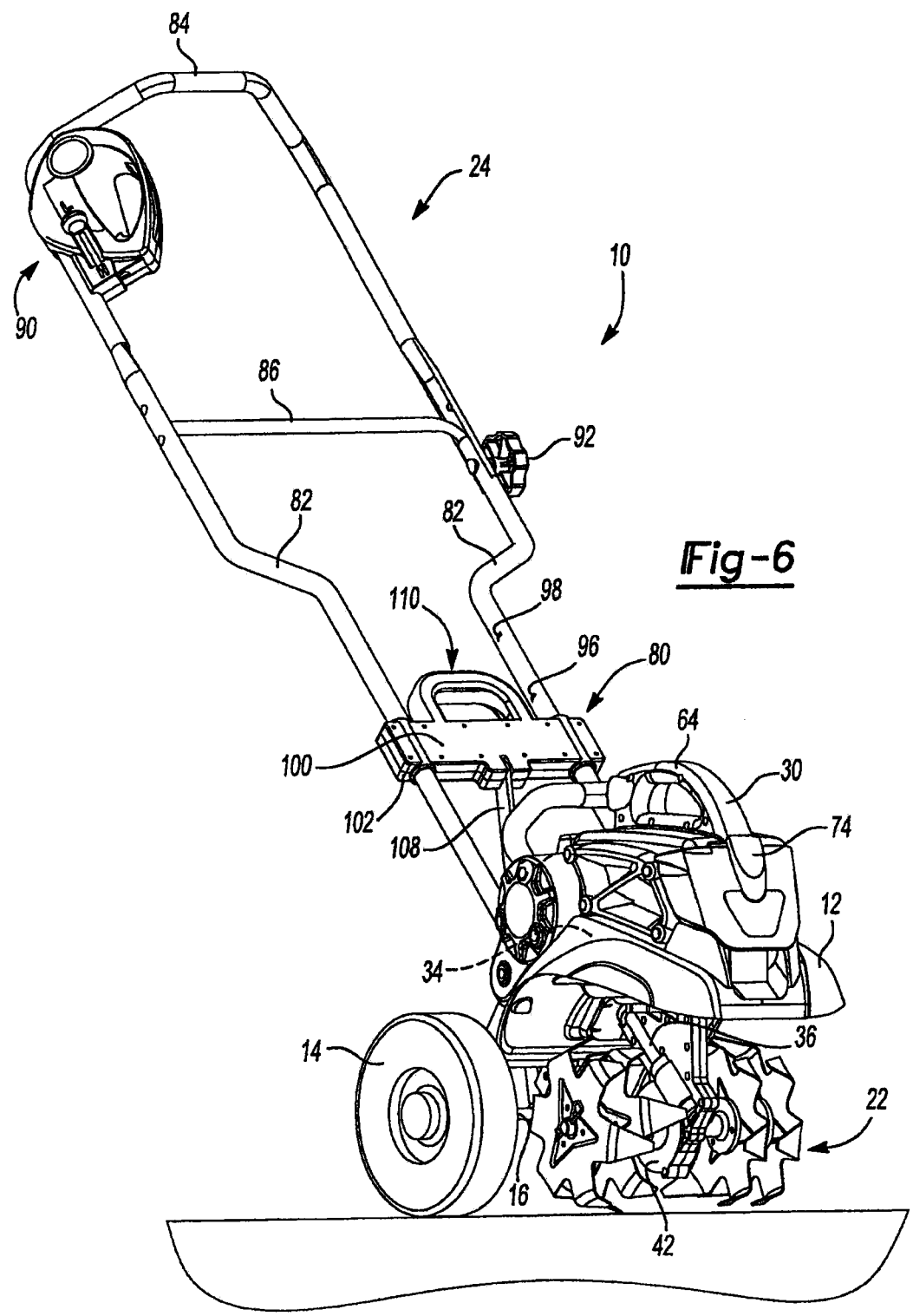
FIG. 6 is a front perspective view of the battery-powered tiller of FIG. 1 and showing an upright assembly according to one example.

With specific reference now to FIG. 6, the upright assembly 24 will be described in greater detail. The upright assembly 24 defines a slider assembly 80, a pair of longitudinal members or lower uprights 82, a handlebar 84, a cross-member 86, and a speed control 90. A knob 92 is selectively secured to one of the lower uprights 82 for selectively coupling the handlebar 84 to the lower upright 82. As will described in greater detail, the slider assembly 80 is configured to slidably actuate along the lower uprights 82 to adjustably locate the height of the wheels 14 (i.e., relative to the ground and tilling implement 22).

Figure 7:
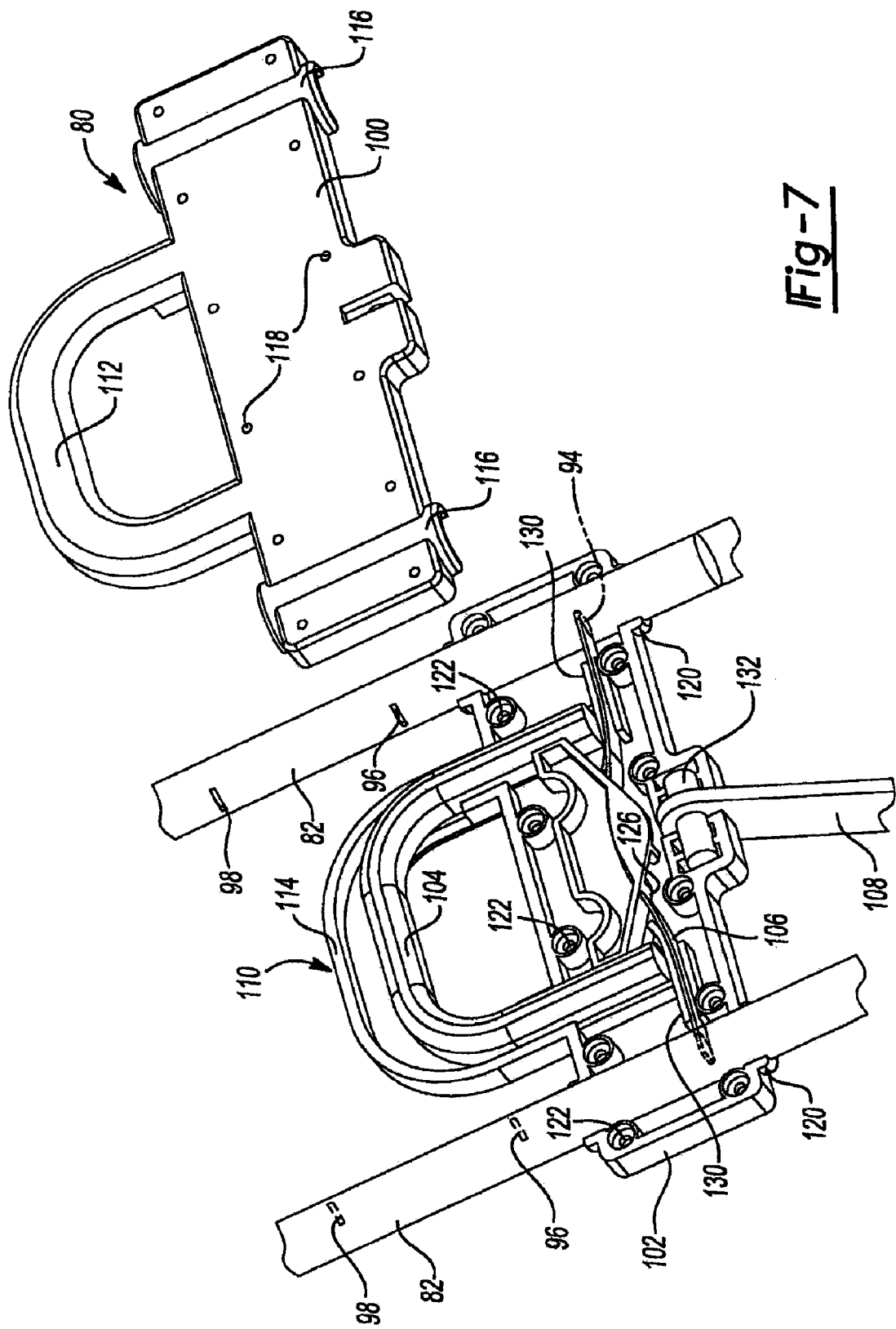
FIG. 7 is a partial exploded perspective view of a slider assembly of the battery-powered tiller of FIG. 1.
Figure 10:
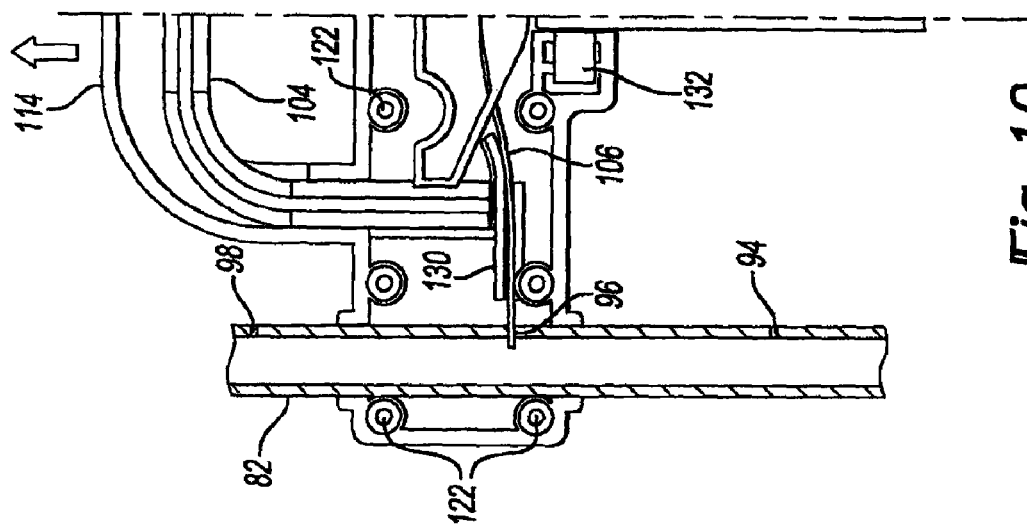
FIGS. 8-10 are partial sectional views of the slider assembly of FIG. 7 showing an exemplary sequence for moving the tiller from a transportation mode (FIG. 8) to a tilling mode (FIG. 10)
Figure 9:
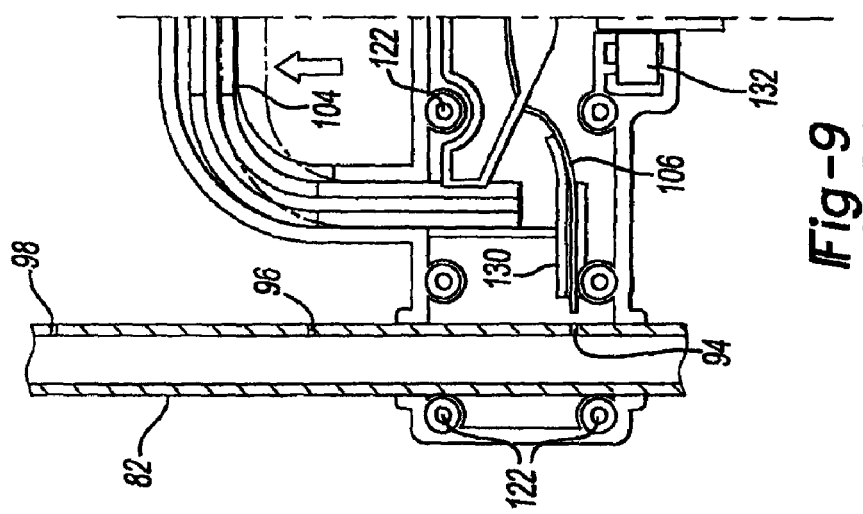
Figure 8:
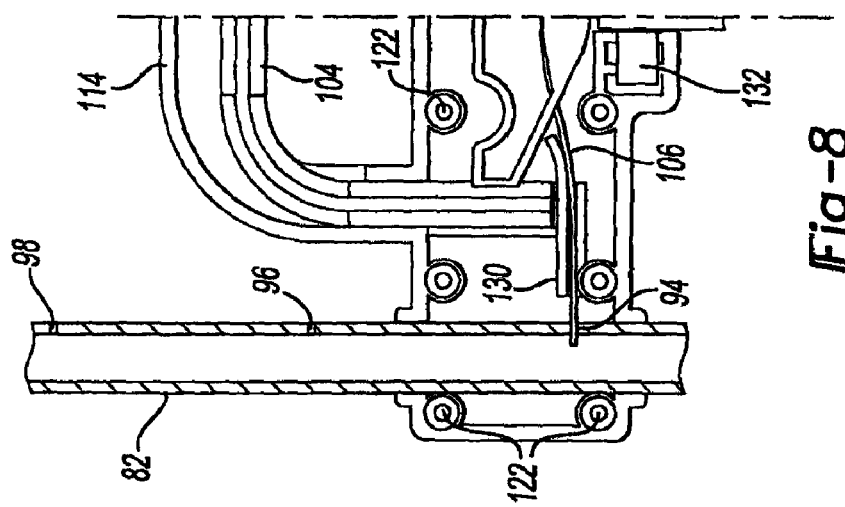

With additional reference now to FIGS. 7-10, additional features of the slider assembly 80 and the lower upright 82 will be described in greater detail. Those skilled in the art will readily appreciate that while the slider assembly 80 is shown operatively associated with a tiller configured for electrical (battery-powered) operation, the slider assembly 80 may be used in tillers having other configurations such as those powered by internal combustion engines for example. In the example shown, the lower upright 82 defines three pair of complementary slots. More specifically, the lower upright 82 defines a pair of transportation mode slots 94, a pair of tilling mode slots 96, and a pair of clearing mode slots 98. The slots of each pair of complementary slots oppose each other. As will be described, the slider assembly 80 is movable along the lower upright 82 to locate at the transportation mode slots 94 (such as shown in FIG. 7) for locating the wheels 14 in a transportation mode (see FIG. 13), the tilling mode slots 96 for locating the wheels 14 at a tilling mode location (see FIG. 14) and the clearing mode slots 98 for locating the wheels 14 in a clearing mode position (see FIG. 15).

Returning now to FIG. 7, the slider assembly 80 generally defines a front housing 100, a rear housing 102, a handle 104, a sliding bar 106, and a first link 108. A handle grip assembly 110 is generally defined by the handle 104, a front gripping portion 112 defined on the front housing 100 and a rear gripping portion 114 defined on the rear housing 102. The front housing 100 defines a pair of front channels 116 and a plurality of apertures 118. The rear housing 102 defines a pair of rear channels 120 and a plurality of blind bores 122. The front channels 116 and the rear channels 120 cooperate in an assembled position to define complementary sleeves for receiving the respective lower uprights 82. While not specifically shown, fasteners can be passed through the respective apertures 118 of the front housing 100 and into the blind bores 122 defined on the rear housing 102 to couple the respective front and rear housings 100 and 102.

The handle 104 defines a finger 126 that captures a central portion of the sliding bar 106. The rear housing 102 includes a pair of guides 130 that provide a track for guiding the sliding bar 106 into and out of engagement with the respective slots 94, 96 and 98. In one example, the sliding bar 106 can be formed of rigid material such as stamped metal.

An exemplary method of using the slider assembly 80 will now be described. Here, a user grasps the handle grip assembly 110 and urges the handle 104 in a generally upright direction (as viewed in FIGS. 8-10). Movement of the handle 104 from an "engaged" position (i.e., with a pair of slots 94, 96 or 98) to a "disengaged" position is represented pictorially from FIG. 8 to FIG. 9. As the handle 104 is moved in the upright direction (identified by the arrow in FIG. 9), the finger 126 (FIG. 7) urges the central portion of the sliding bar 106 in the same upright direction, which ultimately reduces the operating length of the sliding bar 106 and causes the distal ends of the sliding bar 106 to withdraw from a respective slot (such as the transportation mode slots 94 identified in FIG. 8).

Once the distal ends of the sliding bar 106 have been withdrawn from the respective slots (i.e., such as slots 94), a user is free to translate the slider assembly 80 along the lower upright 82 and into alignment with a desired pair of slots (i.e., either of the other pair of slots 96 or 98). Movement of the slider assembly 80 along the lower uprights 82 ultimately causes the first link 108 to urge the wheels 14 between the respective transportation mode position (FIG. 13), tilling mode position (FIG. 14) and clearing mode position (FIG. 15). The first link 108 is pivotally secured at a first end to the slider assembly 80 by way of an axle 132 that is nested in a portion of the rear housing 102.

Figure 16:
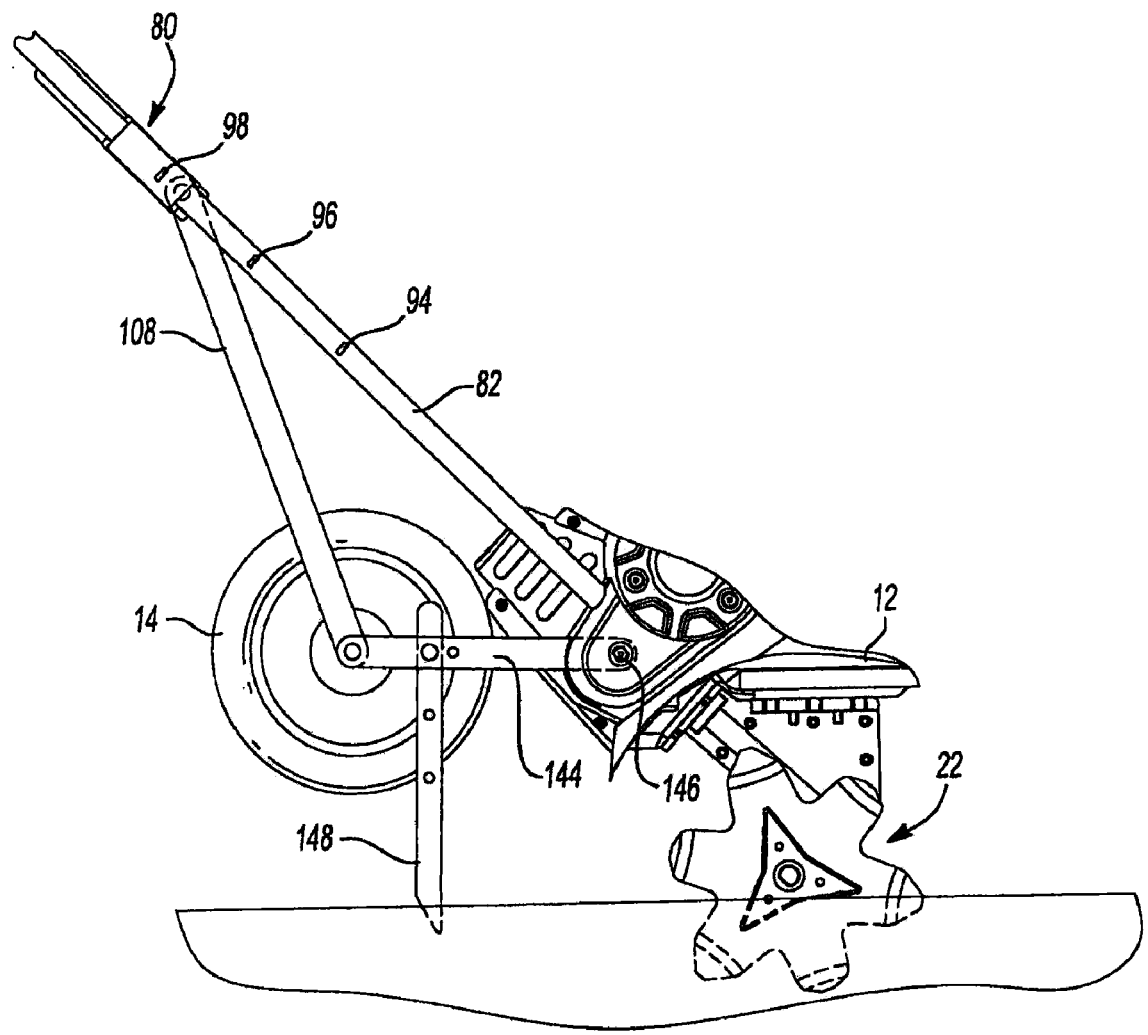
FIG. 16 is a side view of the battery-powered tiller of FIG. 1 and shown in a clearing mode with the drag bar coupled thereto.

With reference now to FIGS. 11 and 12, additional features of the frame 12 of the battery-powered tiller 10 will be described in greater detail. The frame 12 further includes a stabilizing bar 140 that is connected between a pair of second links 144. For clarity, only one of the second links 144 is shown in FIGS. 11 and 12. The second links 144 receive the wheel axle 16 at first ends and are rotatably coupled at a pivot joint 146 (FIG. 13) at an opposite end. The second links 144 can be secured to the stabilizing bar 140 at an intermediate location. A drag bar 148 can be adjustably secured to the stabilizing bar 140 by way of a coupler 150. The coupler 150 defines a slot 152 for receiving a first end of the drag bar 148. A peg 154 is selectively passed through various apertures 158 formed in the drag bar 148 to adjust the operating height of the drag bar 148. A pin 160 can selectively mate with the peg 154 for locating the drag bar 148 at the desired operating position. By way of example, the drag bar 148 is shown in the transportation mode (FIG. 13), and the clearing mode (FIG. 16).

Figure 13:
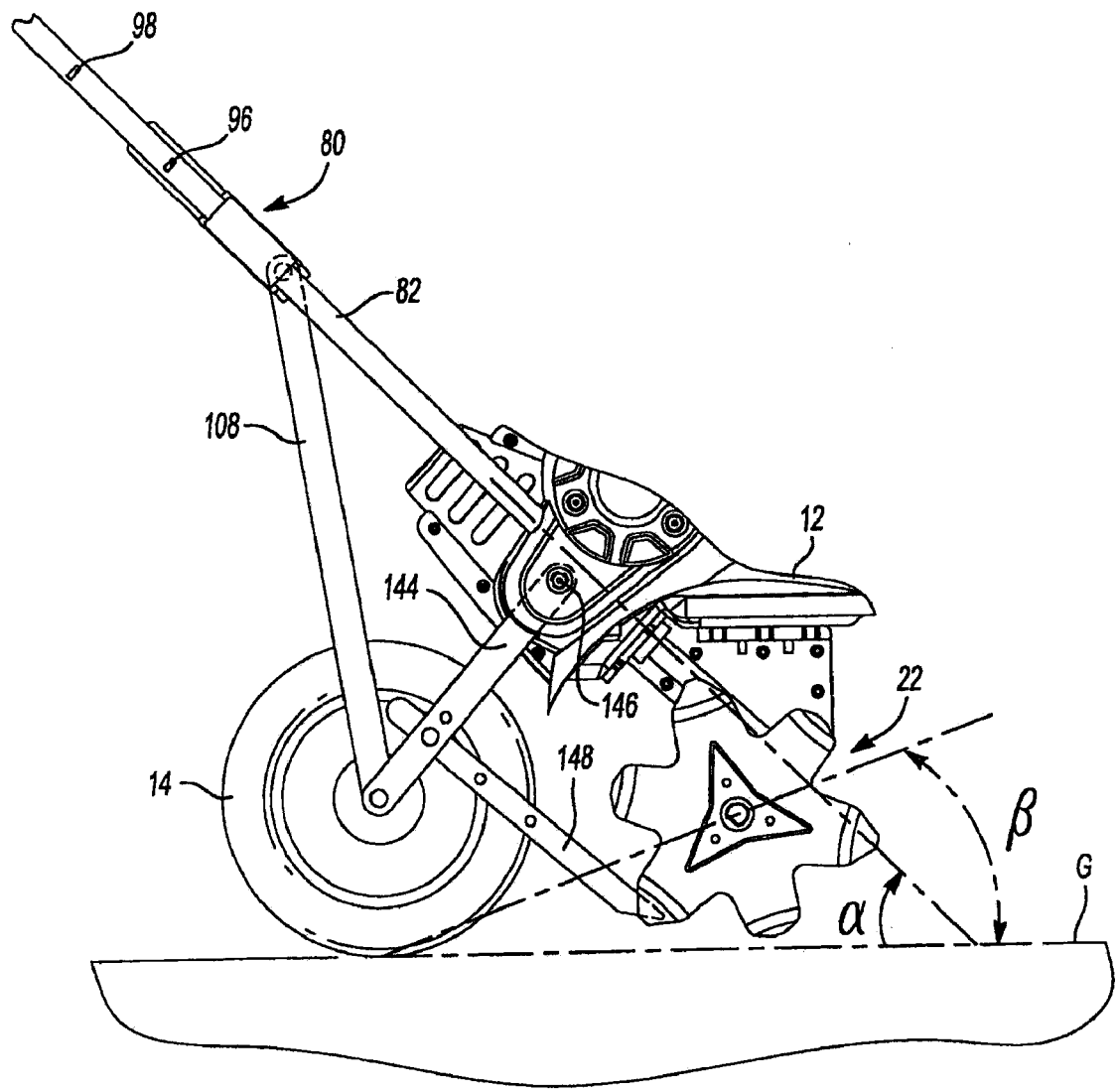
FIG. 13 is a side view of the battery-powered tiller of FIG. 1 and shown in the transportation mode.
Figure 14:
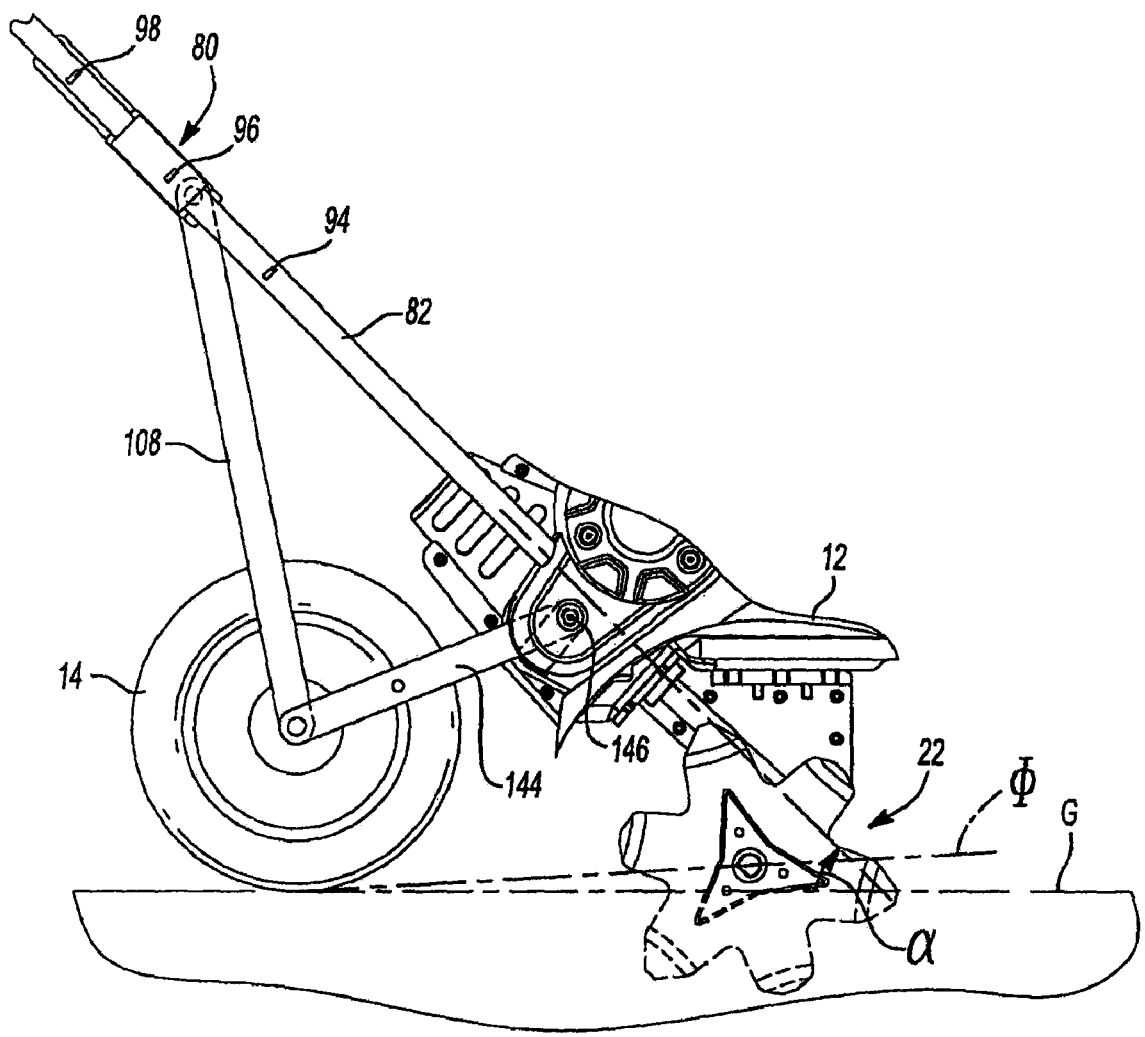
FIG. 14 is a side view of the battery-powered tiller of FIG. 1 and shown in the tilling mode.
Figure 15:
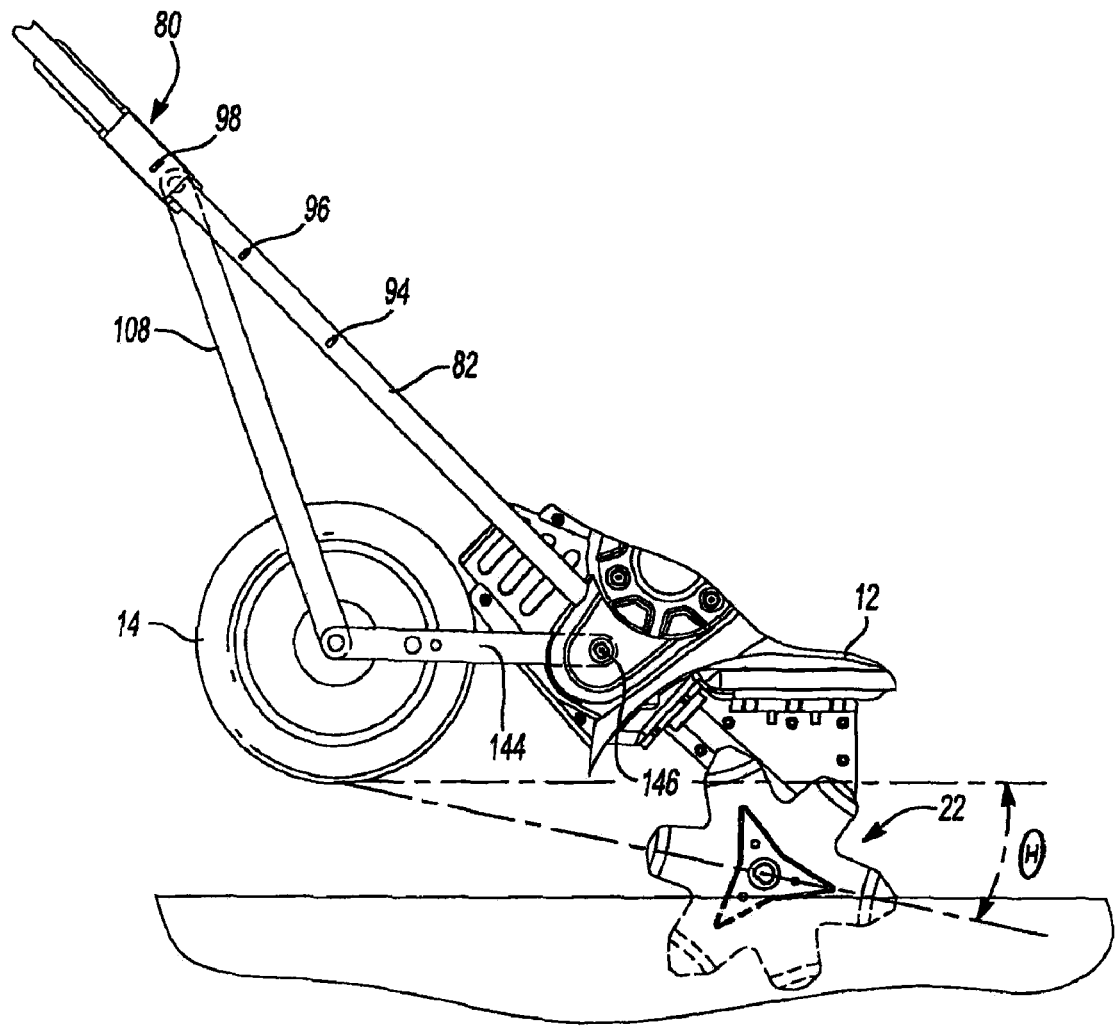
FIG. 15 is a side view of the battery-powered tiller of FIG. 1 and shown in a clearing mode.

Of note, the lower uprights 82 and consequently the upright assembly 24 as a whole defines substantially the same angle α relative to ground G in the transportation mode (FIG. 13) and the tilling mode (FIG. 14). In one example, α can be about 45 degrees. Other angles are contemplated. As shown in FIGS. 13 and 14, the angular relationship of the first link 108 and the second links 144 change to alter the position of the tilling implement 22 without changing the angular orientation of the upright assembly 24 relative to a user. The configuration can offer a streamlined transition to the user between the transportation and tilling modes. Moreover, a user need not push down or pull up on the upright assembly 24 (i.e., in an effort to locate the tilling implement 22 at a desired elevation relative to ground G) when transitioning between the transportation and tilling modes as may be required for other conventional tillers.

Also of note, an angle can be defined from a horizontal line that the wheels 14 engage the ground G to a line that extends through the axis of the tilling implement 22. This angle is represented as β and φ in FIGS. 13 and 14, respectively. The angle φ in FIG. 14 can be about 0 degrees. An angle Θ can be defined from a horizontal line that passes along the bottom of the wheels 14 and is parallel to the ground G and a line that extends through the axis of the tilling implement 22.

Figure 17:
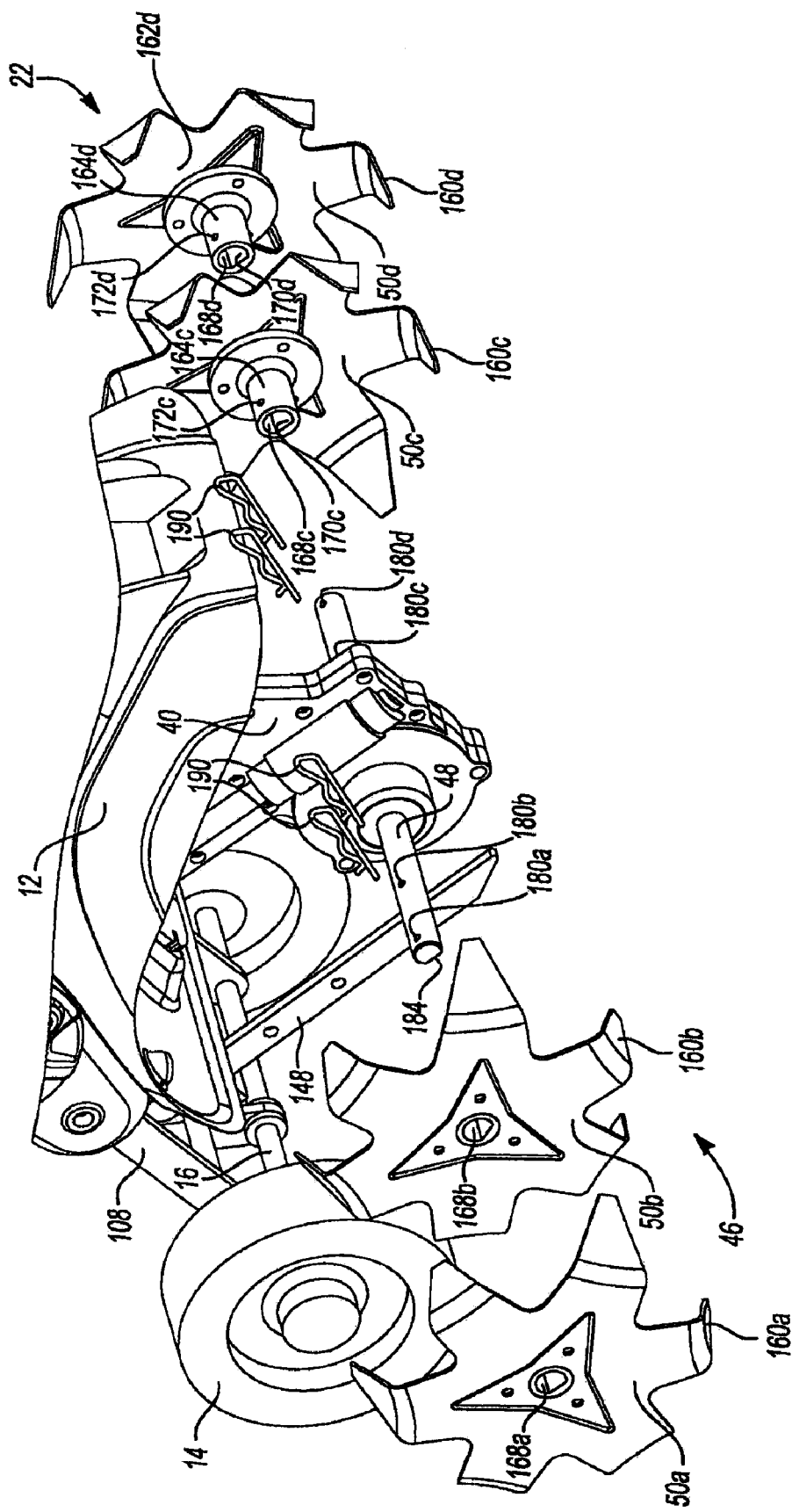
FIG. 17 is an exploded front perspective view of the tilling implement of the battery-powered tiller of FIG. 1 and shown with the tine plates in a first configuration.
Figure 18:
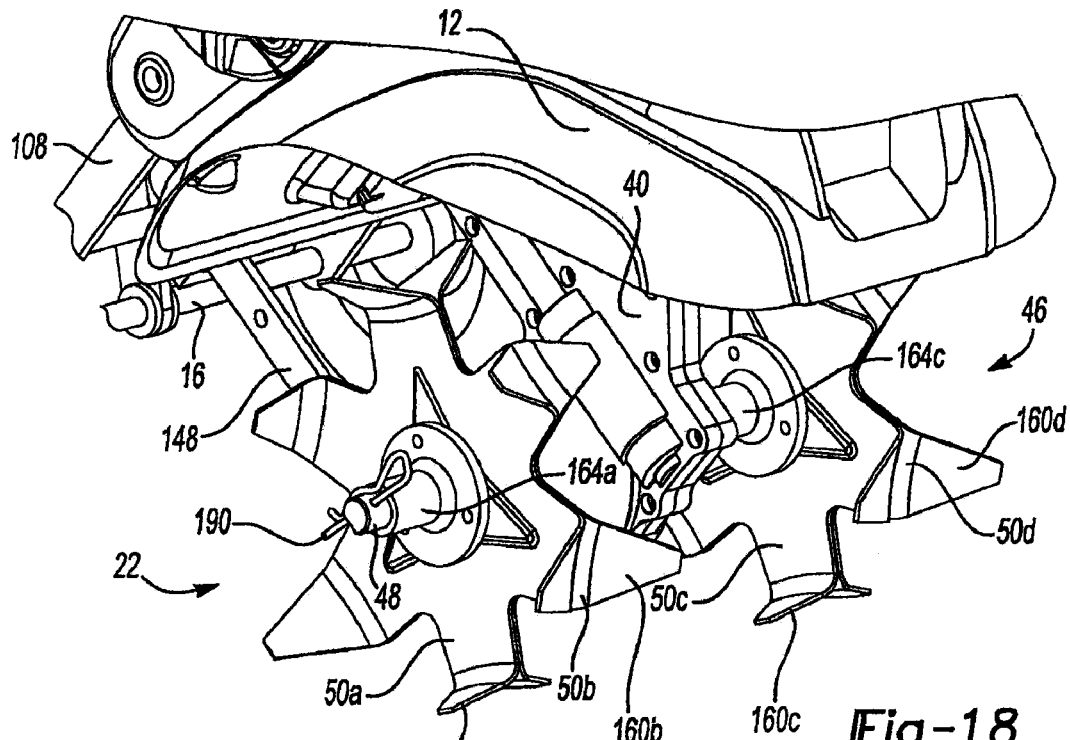
FIG. 18 is a front perspective view of the tilling implement and shown with the tine plates are assembled in a second configuration.
Figure 19:
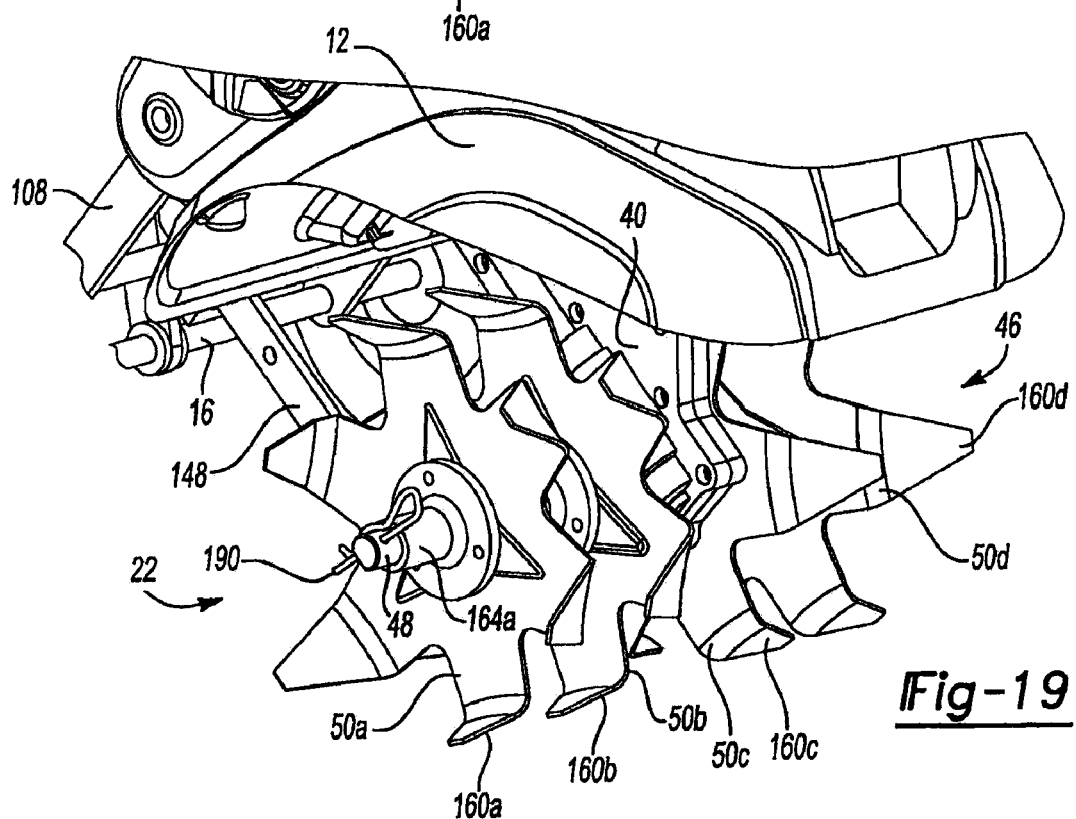
FIG. 19 is a front perspective view of the tilling implement and shown with the tine plates assembled in a third configuration.
Figure 20:
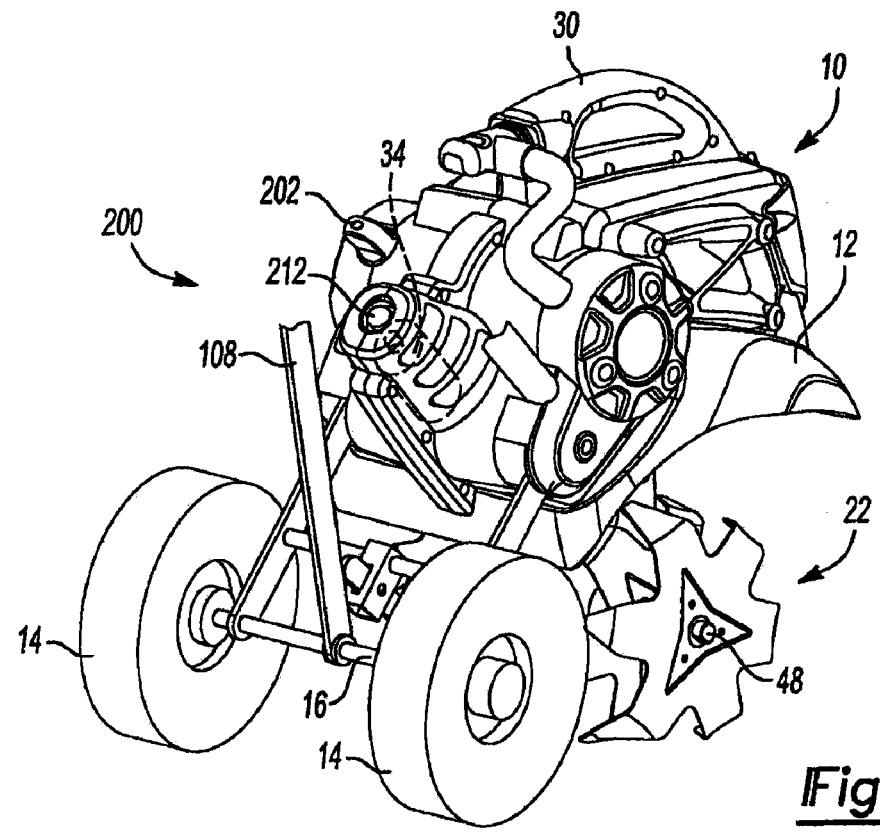
FIG. 20 is a rear perspective view of the battery-powered tiller of FIG. 1 and illustrating an unjamming mechanism according to one example of the present teachings wherein a key of the unjamming mechanism is shown inserted into a first receiver during normal operation of the battery-powered tiller.
Figure 21:
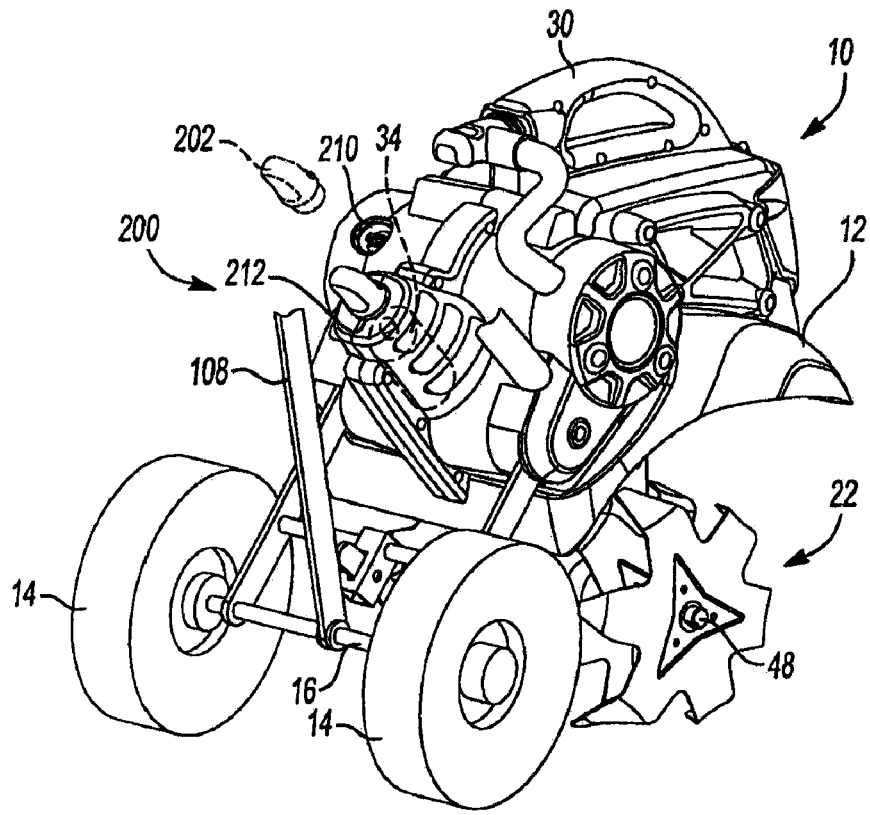
FIG. 21 is a rear perspective view of the battery-powered tiller of FIG. 20 and shown with the key removed from the first receiver and inserted into the second receiver of the unjamming mechanism.
Figure 22:
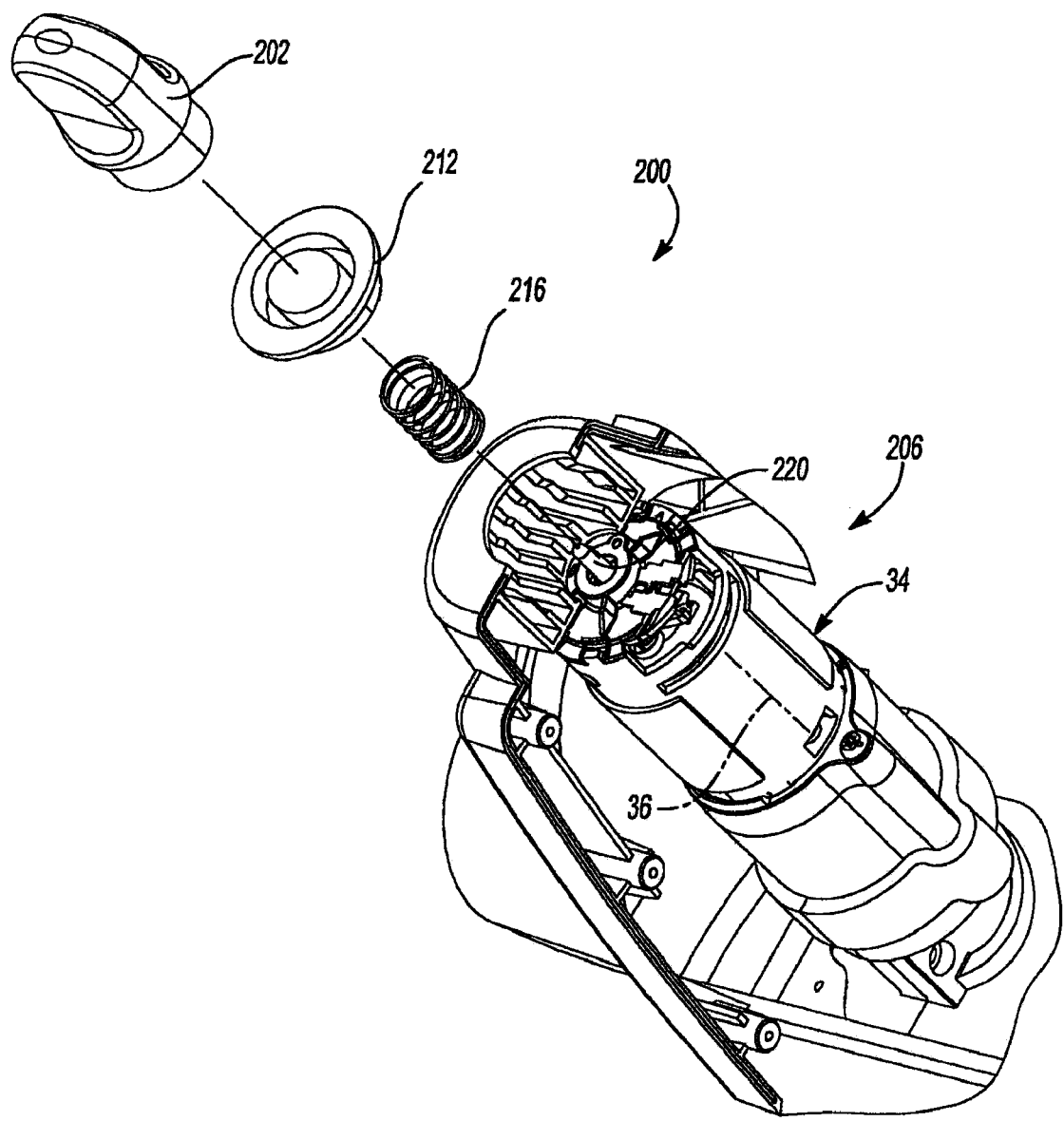
FIG. 22 is an exploded, partial cut-away view of the unjamming mechanism of FIG. 20.
Figure 23:
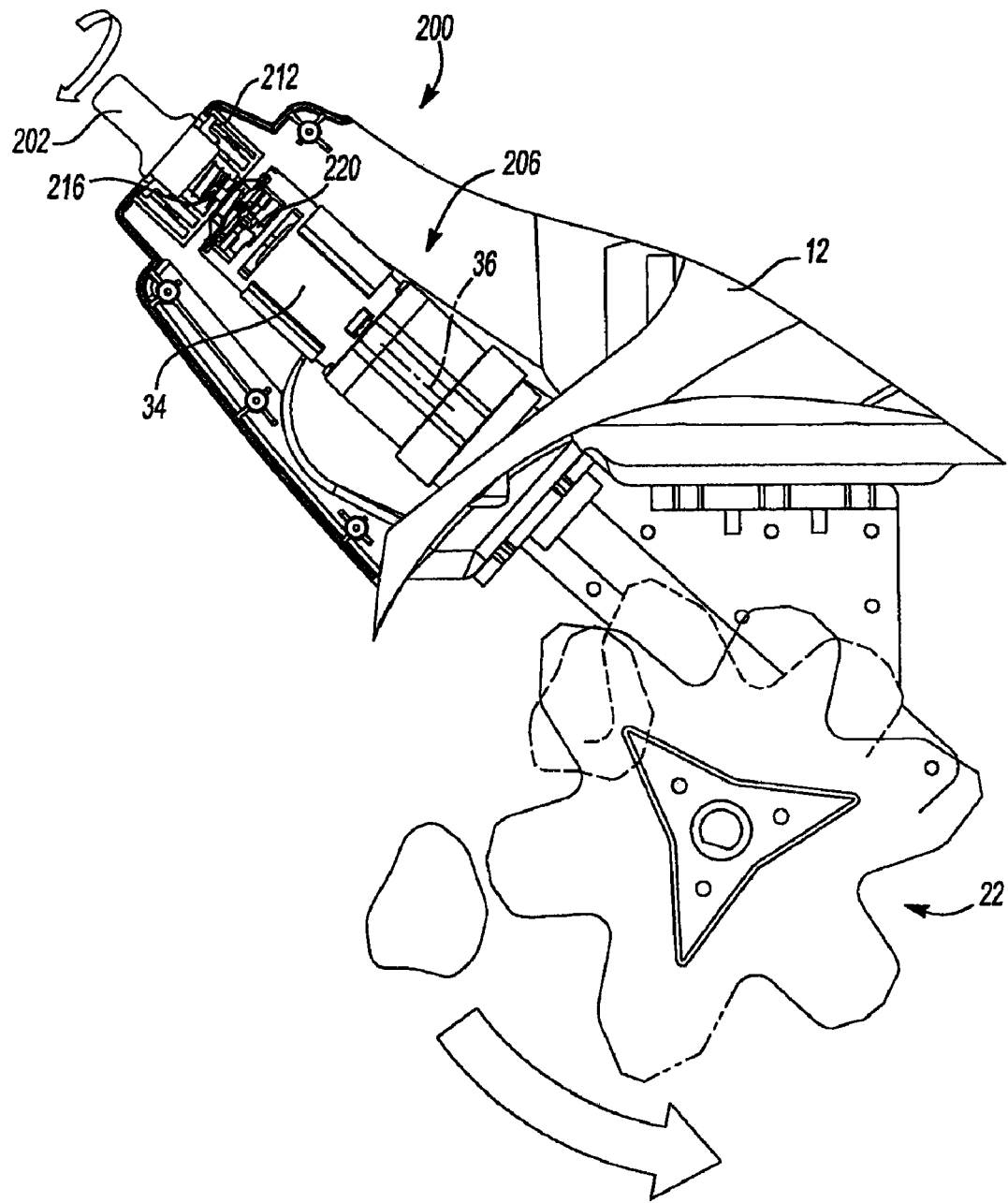
FIG. 23 is a side partial cut-away view of the unjamming mechanism of FIG. 20 wherein the key is rotated causing the tilling implement to rotate in a reverse direction and thereby free a rock from a jammed position.

Turning now to FIGS. 17-19, the tilling implement 22 according to various features will be described in greater detail. Those skilled in the art will readily appreciate that while the tilling implement 22 is shown operatively associated with a tiller configured for electrical (battery-powered) operation, the tilling implement 22 may be used in tillers having other configurations, such as those powered by internal combustion engines, for example. As identified above, the tilling implement 22 has a plurality of tine plates 46 including the first tine plate 50a, the second tine plate 50b, the third tine plate 50c, and the fourth tine plate 50d. Each of the tine plates 50a-50d are configured equivalently. In this way, only a description of one of the tine plates 50d will be described herein. However, it should be appreciated that the tine plates may be configured differently. The tine plate 50d generally defines a plurality of tines 160d extending from a central body 162d. A central hub 164d can be fixedly secured at the body 162d. The hub 164d can define a passage 168d having an axis that is perpendicular to a plane of the central body 162d. The passage 168d can be formed entirely through the tine plate 50d. The hub 164d also defines a flat portion 170d so that the passage 168d formed through the hub 164d has a cross-section similar to the letter "D". The tines 160d can be curved at their respective ends in a direction generally toward the hub 164d. The hub 164d can define an aperture 172d formed in a direction generally perpendicular to a longitudinal axis of the hub 164d.

The tilling implement 22, by way of the tilling implement drive shaft 48, is operable to communicate rotational motion onto the plurality of tine plates 46 during operation. The tilling implement drive shaft 48 defines a plurality of apertures 180a, 180b, 180c, and 180d formed therethrough. The tilling implement drive shaft 48 generally includes a longitudinal bar having a flat portion 184 defined thereon. According to the present teachings, the plurality of tine plates 46 of the tilling implement 22 can be selectively configured in various orientations along the tiller drive shaft 180. For example, the configuration illustrated in FIG. 17 provides all four tine plates 50a, 50b, 50c, and 50d having their respective tines 160a, 160b, 160c, and 160d pointed in a generally inboard direction.

In order to secure the respective tine plates 50a-50d to the tiller drive shaft 48, cotter pins 190 can be selectively secured through the respective apertures 172a-172d of hubs 164a-164d and into the corresponding aperture 180a-180d formed through the tilling implement drive shaft 48. The respective flat portions 170a-170d formed in the hubs 164a-164d can be rotatably aligned with the complementary flat portion 184 formed on the drive shaft 48 in order to properly align the respective apertures 172a-172d and 180a-180d.

In a second configuration of the tine plates 46 as illustrated in FIG. 18, the tines 160a and 160d of the first tine plate 50a and fourth tine plate 50d, respectively, are oriented generally outboard, while the tines 160b of the second tine plate 50b and the tines 160c of the third tine plate 50c are oriented in a direction generally inboard. Another configuration is shown in FIG. 19 where the tines 160a of the first tine plate 50a, the tines 160b of the second tine plate 50b, the tines 160c of the third tine plate 50c, and the tines 160d of the fourth tine plate 50d are all oriented in an outboard direction. It is appreciated that a user can simply flip a desired tine plate 50a-50d to orient the respective tines 160a-160d in either an inboard or outboard direction. It is appreciated that the versatility of the plurality of tine plates 46 of the tilling implement 22 can offer a user various tilling configurations (not all shown herein) that may be desirable according to a given tilling task. Other configurations can include operation with less than all four tine plates 50a-50d coupled to the tilling implement 22. Furthermore, because all the tine plates 50a-50d are configured the same, a user can arbitrarily select any tine plate 50a-50d in sequence during assembly.

Turning now to FIGS. 20-23, a tiller unjamming mechanism of the present teachings is shown and generally identified at reference numeral 200. The unjamming mechanism 200 generally includes a key 202, and a gearing unit 206. According to one method of operation, the key 202 is moved from a first receiver 210 to a second receiver 212 to activate the unjamming mechanism 200. In general, the key 202 is accepted by the first receiver 210 during normal operation of the battery-powered tiller 10. In the event that an object, such as a rock, becomes lodged or jammed between respective tines of the plurality of tines 46, the key 202 is removed from the first receiver 210 and inserted into the second receiver 212.

Withdrawal of the key 202 from the first receiver 210 causes the motor 34 of the drive mechanism 20 to be disconnected from electrical communication with the battery 30. Once the key 202 is located into the second receiver 212, the key 202 can be pushed (i.e., in a direction toward the second receiver 212) against a biasing force provided by a biasing member 216 and rotated in a first direction (such as counter-clockwise for example). Rotation of the key 202 rotates a gripping detail 220 extending from the gearing unit 206 of the motor 34.

The gearing unit 206 offers a mechanical advantage with the motor 34 to rotate the tilling implement 22 in a reverse direction (in a direction opposite of an operating direction). In other words, multiple rotations of the gripping detail 220, which is attached to the output member 36 associated with the motor 34, can result in a single rotation of the tilling implement 22 in a reverse direction. In one exemplary implementation, a mechanical advantage of about one hundred twenty (120) revolutions of the output shaft 222 of the motor 34 can equal one rotation of the tilling implement 22. Other ratios are contemplated. By rotating the tilling implement 22 in a reverse direction, the object, such as the rock, can be easily dislodged from the tilling implement 22. Once the tilling implement 22 has become free from obstruction, the key 202 can be withdrawn from the second receiver 212 and returned to the first receiver 210 where normal battery-powered tiller operation can resume.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the disclosure without departing from the essential scope thereof. Therefore, it is intended that the disclosure not be limited to the particular embodiments illustrated by the drawings and described in the specification as the best mode presently contemplated for carrying out this disclosure, but that the disclosure will include any embodiments falling within the foregoing description and the appended claims.

What is claimed is:

1. A tiller comprising:
a frame supported by at least one wheel;
an upright assembly extending from the frame and including a pair of longitudinal members extending from the frame and defining a first and second pair of slots formed therein;
a drive mechanism supported by the frame and including a motor having an output member;
a tilling implement having a drive shaft that is driven by the output member, the tilling implement comprising at least one tine plate; and
a slider assembly communicating with the at least one wheel and movably coupled along the upright assembly, the slider assembly configured to securably locate in at least a first position wherein the at least one wheel is located at a first elevation relative to the frame and a second position wherein the at least one wheel is located at a second elevation relative to the frame, the first and second elevations being distinct wherein the slider assembly further comprises a housing, a handle and a bar, wherein the housing slides along the longitudinal members and the bar selectively locates into one of the first and second pair of slots in response to manipulation of the slider assembly, wherein the handle moves relative to the housing and the bar moves in response to movement of the handle and wherein an effective length of the bar is reduced upon movement of the handle in a first direction causing opposite ends of the bar to withdraw from a respective pair of slots.

2. The tiller of claim 1 wherein the upright assembly defines a first angle with respect to ground in the first position and defines a second angle with respect to ground in the second position, wherein the first and second angles are substantially equivalent.

3. The tiller of claim 1, wherein the slider assembly is configured to securably locate in a third position wherein the at least one wheel is located at a third elevation relative to the frame, the third elevation being distinct from the first and second elevations.

4. The tiller of claim 2, further comprising a link interconnected between the slider assembly and the at least one wheel, wherein movement of the slider assembly between the first and second positions urges movement of the link which causes the at least one wheel to move between the first and second elevations, respectively.

5. The tiller of claim 4, further comprising a drag bar operably interconnected to the link wherein movement of the slider assembly results in movement of the drag bar.

6. The tiller of claim 1, further comprising:
a battery removably received into a receiving portion defined on the frame and supplying a current to the motor in an installed position wherein the battery is positioned at a substantially centralized location on the frame.

7. A tiller comprising:
a frame supported by at least one wheel;
a pair of uprights extending from the frame and each having a first and second slot formed therein;
a drive mechanism supported by the frame and including a motor having an output member;
a battery selectively retained on the frame and supplying a current to the motor in an installed position;
a tilling implement having a drive shaft that is driven by the output member, the tilling implement comprising at least one tine plate; and
a slider assembly operably coupled with the at least one wheel and slidably communicating along the upright assembly, the slider assembly configured to securably locate on the pair of uprights in at least a first position wherein the at least one wheel is located at a first elevation relative to the frame and a second position wherein the at least one wheel is located at a second elevation relative to the frame, the first and second elevations being distinct wherein the slider assembly comprises a handle that moves relative to the housing and wherein a bar moves in response to movement of the handle such that an effective length of the bar is reduced upon movement of the handle in a first direction causing opposite ends of the bar to withdraw from a respective pair of slots.

8. The tiller of claim 7 wherein the pair of uprights define a first angle with respect to ground in the first position and define a second angle with respect to ground in the second position, wherein the first and second angles are substantially equivalent.

9. The tiller of claim 7 wherein the slider assembly further comprises a housing that slides along the pair of uprights and at least partially houses the bar.

10. The tiller of claim 7, wherein the slider assembly is configured to securably locate on the pair of uprights in a third position wherein the at least one wheel is located at a third elevation relative to the frame, the third elevation being distinct from the first and second elevations.

11. The tiller of claim 8, further comprising a link interconnected between the slider assembly and the at least one wheel, wherein movement of the slider assembly between the first and second positions urges movement of the link which causes the at least one wheel to move between the first and second elevations, respectively.

12. The tiller of claim 11, further comprising a drag bar operably interconnected to the link wherein movement of the slider assembly results in movement of the drag bar.

13. A tiller comprising:
a frame supported by at least one wheel;

a pair of uprights extending from the frame, each upright of the pair of uprights having a first and second slot formed therein;

a drive mechanism supported by the frame and including a motor having an output member;

a tilling implement having a drive shaft that is driven by the output member, the tilling implement comprising at least one tine plate;

a slider assembly operably coupled with the at least one wheel and slidably communicating along the upright assembly, the slider assembly configured to securably locate on the pair of uprights in at least a first position wherein the at least one wheel is located at a first elevation relative to the frame and a second position wherein the at least one wheel is located at a second elevation relative to the frame, the first and second elevations being distinct;

a link interconnected between the slider assembly and the at least one wheel, wherein movement of the slider assembly between the first and second positions urges movement of the link which causes the at least one wheel to move between the first and second elevations, respectively;

a drag bar operably interconnected to the link wherein movement of the slider assembly results in movement of the drag bar; and a handle that moves relative to the pair of uprights and that urges a bar to selectively locate within the first slots in the first position and locate within the second slots in the second position wherein an effective length of the bar is reduced upon movement of the handle in a first direction causing opposite ends of the bar to withdraw from a respective pair of slots.

* * * * *